United States Patent
Ting

(10) Patent No.: US 9,052,920 B2
(45) Date of Patent: Jun. 9, 2015

(54) ELECTRONIC DEVICES AND METHODS FOR SWITCHING BETWEEN DUAL OPERATING SYSTEMS

(71) Applicant: WISTRON CORP., New Taipei (TW)

(72) Inventor: Tung-Sheng Ting, New Taipei (TW)

(73) Assignee: Wistron Corp., New Taipei (TW)

( * ) Notice: Subject to any disclaimer, the term of this patent is extended or adjusted under 35 U.S.C. 154(b) by 319 days.

(21) Appl. No.: 13/731,904

(22) Filed: Dec. 31, 2012

(65) Prior Publication Data

US 2013/0227270 A1 Aug. 29, 2013

Related U.S. Application Data

(60) Provisional application No. 61/602,569, filed on Feb. 23, 2012.

(30) Foreign Application Priority Data

Sep. 24, 2012 (TW) .............................. 101134872 A

(51) Int. Cl.
*G06F 9/24* (2006.01)
*G06F 15/177* (2006.01)
*G06F 9/44* (2006.01)
*G06F 12/14* (2006.01)
*G06F 3/06* (2006.01)

(52) U.S. Cl.
CPC .............. *G06F 9/4411* (2013.01); *G06F 12/14* (2013.01); *G06F 3/0605* (2013.01); *G06F 9/441* (2013.01)

(58) Field of Classification Search
CPC ...... G06F 3/0605; G06F 9/4411; G06F 12/14
USPC ................................... 713/1, 2, 100; 719/319
See application file for complete search history.

(56) References Cited

U.S. PATENT DOCUMENTS

| | | |
|---|---|---|
| 7,421,735 B2 | 9/2008 | Kerstens et al. |
| 7,685,598 B1 | 3/2010 | Badenell et al. |
| 8,549,326 B2 | 10/2013 | Mohamed |
| 8,595,511 B2 | 11/2013 | Aratsu et al. |
| 8,645,715 B2 | 2/2014 | Dawson et al. |

(Continued)

FOREIGN PATENT DOCUMENTS

| | | |
|---|---|---|
| TW | 200712875 A | 4/2007 |
| TW | 200841710 A | 10/2008 |
| TW | 201025138 A | 7/2010 |

OTHER PUBLICATIONS

Taiwan Patent Office, Office Action, Patent Application U.S. Appl. No. 101134872, Jul. 17, 2014, Taiwan.

(Continued)

*Primary Examiner* — Michael J Brown

(57) ABSTRACT

A method for switching between dual operating systems for an electronic device installed with at least two operating systems is provided. The method includes the steps of: activating and operating a first operating system, wherein the first operating system initializes at least one peripheral device; switching to and activating a second operating system; preventing the first operating system from issuing a setting command to the peripheral device when the first operating system is switched to the second operating system; and enabling the second operating system to obtain the control right of the peripheral device to initialize the peripheral device.

12 Claims, 5 Drawing Sheets

(56) References Cited

U.S. PATENT DOCUMENTS

| | | |
|---|---|---|
| 2008/0177905 A1 | 7/2008 | Ohta et al. |
| 2009/0058887 A1 | 3/2009 | Lin |
| 2009/0059965 A1 | 3/2009 | Lin et al. |
| 2009/0061838 A1 | 3/2009 | Lin |
| 2009/0064186 A1 | 3/2009 | Lin |
| 2009/0064195 A1 | 3/2009 | Chin et al. |
| 2009/0113458 A1* | 4/2009 | Finger et al. .................. 719/327 |
| 2010/0172499 A1 | 7/2010 | Sugiyama |
| 2013/0262862 A1 | 10/2013 | Hartley |

OTHER PUBLICATIONS

US Patent Office, Office Action, U.S. Appl. No. 13/731,889, Mar. 13, 2014, US.

* cited by examiner

ELECTRONIC DEVICES AND METHODS FOR SWITCHING BETWEEN DUAL OPERATING SYSTEMS

CROSS REFERENCE TO RELATED APPLICATIONS

The application claims the benefit of U.S. Provisional Application 61/602569, filed on Feb. 23, 2012 and claims priority under 35 U.S.C. §119(a) on Patent Application No(s). 101134872, filed in Taiwan, Republic of China on Sep. 24, 2012, the entire contents of which are hereby incorporated by reference.

BACKGROUND OF THE INVENTION

1. Field of the Invention

The present invention relates to dual operating system architectures, and in particular, relates to techniques for switching between dual operating system.

2. Description of the Related Art

Portable electronic devices, such as notebook computers and smartphones, have become indispensable for modern day humans.

Conventionally, the operating system of the electronic devices which is mostly used is the Microsoft Windows operating system (OS). Nowadays, however, the Android OS, which is based on a Linux operating system, is also popularly used. The two operating systems perform differently with different operations. In order to take advantage of both of the operating systems, some designs integrate the two operating systems into a single one electronic device. In some designs, the electronic device has only one CPU that processes instructions for dual operating systems, while in some other designs, separate CPUs are respectively in charge of one of the operating systems. Generally, in dual operating system architecture, only one of the operating systems will be in operation while the other will stay in a sleep state at the same time. In the manner, the dual operating systems can share resources with each other and unnecessary conflicts may be prevented.

However, even after the dual operating systems are switched, the driving programs of one of the operating systems which is in the sleep state will still send system commands and settings to peripheral devices, wherein the system commands and settings will sometimes cause conflicts with the system commands and settings sent from a competing operating system which is in operation and initializing the peripheral devices. The conflicts may not only lead to initialization failure and problems with the operation of the peripheral devices, but, in a worst case scenario, system shutdown or crashing.

BRIEF SUMMARY OF THE INVENTION

The present invention provides a method for switching between dual operating systems for an electronic device installed with at least two operating systems, comprising the steps of: activating and operating a first operating system, wherein the first operating system initializes at least one peripheral device; switching to and activating a second operating system; preventing the first operating system from issuing a setting command to the peripheral device when the first operating system is switched to the second operating system; and enabling the second operating system to obtain the control right of the peripheral device to initialize the peripheral device.

The present invention further provides an electronic device installed with a first operating system and a second operating system and having at least one peripheral device, comprising: a first synchronization manager, operating under the first operating system; a second synchronization manager, operating under the second operating system; and a coupled to the first synchronization manager, the second synchronization manager and the at least one peripheral device, preventing the first operating system from issuing the setting command to the peripheral device when the first operating system is switched to the second operating system.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. The description is made for the purpose of illustrating the general principles of the invention and should not be taken in a limiting sense. The scope of the invention is best determined by reference to the appended claims.

Figure 1:
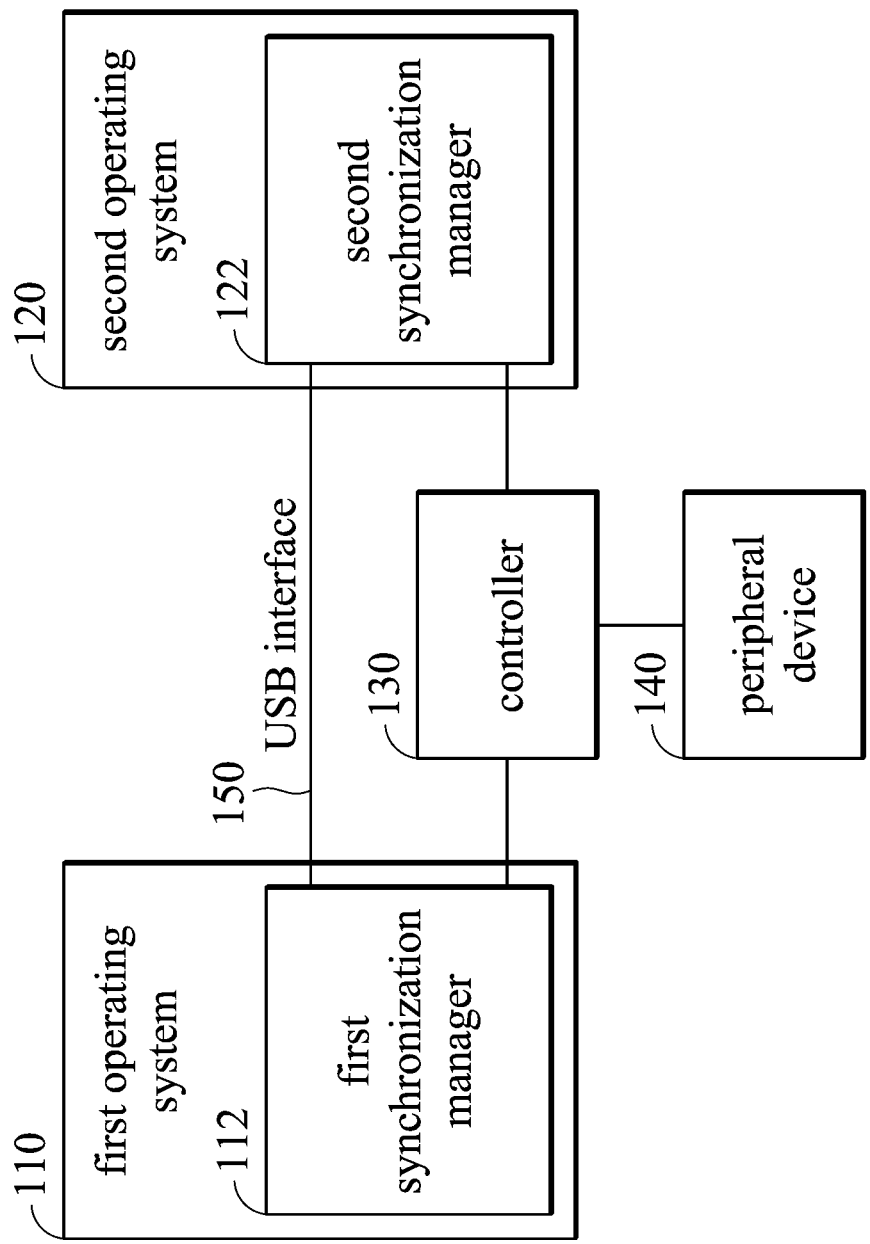
FIG. 1 is a schematic diagram of an electronic device which operates dual operating systems according to an embodiment of the present invention

To prevent conflict from occurring during the switching of operating systems, the present invention provides a new technique for switching between dual operating system.
Dual Operating System Architecture FIG. 1 is a schematic diagram of an electronic device which operates dual operating systems according to an embodiment of the present invention; The electronic device 100 of the present invention can be a notebook computer or a smart phone, which comprises: a first operating system 110, a second operating system 120, a controller 130 and a peripheral device 140. For example, the first operating system 110 can be a Windows operating system, and the second operating system 120 can be an Android operating system. However, the present invention is not limited to the example, and can be applied to various operating systems. The controller 130 of the present invention, for example, is an independent embedded (EC), which is coupled to the two operating systems 110 and 120 and the peripheral device 140, and can be used to control the peripheral device 140 according to commands issued from the two operating systems 110 and 120. The peripheral device 140 of the present invention comprises various input/output device s such as keyboards, mice, touchpads, trackballs, trackpoints, displays, speakers, headsets, and cameras, etc. (not shown in FIG. 1). The peripheral device 140 can be used to perform various specific functions. It is noted that the two operating systems 110 and 120 can share the peripheral device 140 via the independent controller 130.

In a preferred embodiment, there is first synchronization manager 112 running a the first operating system 110, and a second synchronization manager 122 running under the second operating system 120. The synchronization managers 112 and 122 can be used to coordinate the switching and data synchronization between the operating systems 110 and 120. In the embodiment, the synchronization managers 112 and 122 are not only coupled to the controller 130, but also coupled to each other via a transmission interface 150. For example, The transmission interface 150 is a universal serial bus (USB) interface. With the USB interface 150, the operating systems 110 and 120 can exchange information more directly, and the probability of conflict between the two operating systems can thus be reduced. The USB interface is merely for illustration, and the present invention should not be limited thereto.

The electronic device 110 with the dual operating system architecture described above can be used to perform the method of the present invention to switch between dual operating systems. Each step of the method of the present invention will be described in accordance with FIGS. 1-5 in the following.

Method for Switching Between Dual Operating Systems—First Embodiment

Figure 2:
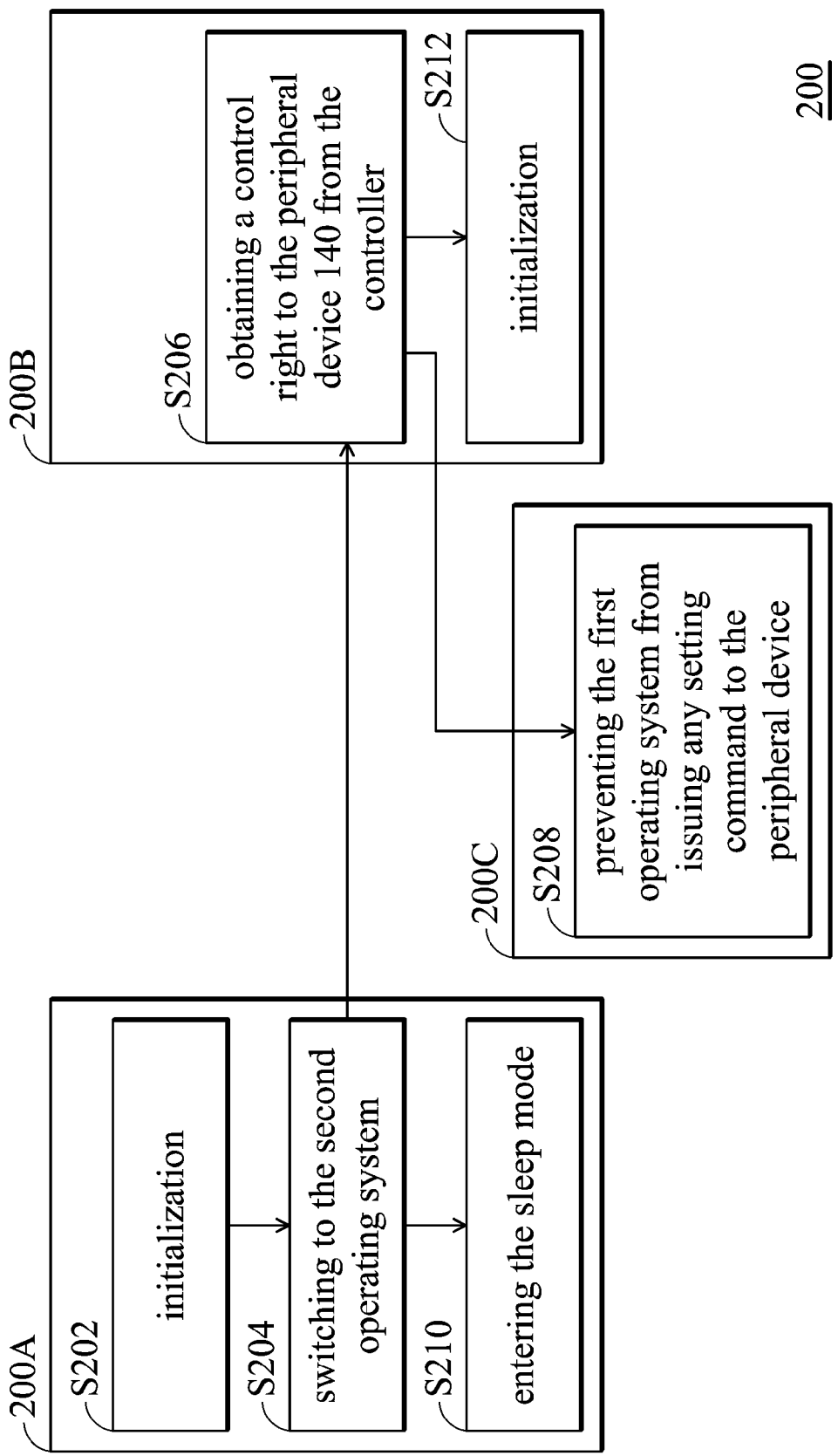
FIG. 2 is a flow chart of the method for switching between dual operating systems according to the first embodiment of the present invention.

FIG. 2 is a flow chart of the method for switching between dual operating systems according to the first embodiment of the present invention. Please refer to FIGS. 1 and 2. Method 200 of the present invention can be performed on the electronic device 100 described above, and can be divided into three processes: process 200A, which is performed by the first synchronization manager 112 under the first operating system 110; process 200B, which is performed by the second synchronization manager 122 under the second operating system 120; and process 200C, which is performed by the controller 130. For illustration, the processes 200A, 200B and 200C are respectively shown in different blocks in FIG. 2. Note that although the following embodiments merely describes the of switching from the first operating system to the second operating system, the process of switching from the second operating system to the first operating system can be performed in the same manner and thus will not be further discussed.

The processes 200A of the first operating system 110 comprises: in step S202, initializing the peripheral device 140 via the controller 130; in step S204, when receiving a command for switching operating system from a user (for example, the user presses designated keys on the keyboard, or clicks designated objects on the display interface), activating (awaking) the second operating system 120 via controller 130, communicating with the second operating system 120 via the transmission interface 150, and switching to the second operating system 120 via the controller 130; and finally the sleep mode is entered into in step S210. The "sleep mode" in step 210 can help to save more power than a standby mode for the electronic device 100.

The processes 200B of the second operating system 120 comprises: in step S206, obtaining a control right to the peripheral device 140 from the controller 130 and finishing the switching of the operating systems; and re-initializing the peripheral device 140 in step S212. Since different operating systems use different drivers to drive the same hardware components, to make sure that the peripheral devices will operate normally, the peripheral devices must be re-initialized each time the operating systems are switched.

Note that the first operating system 110 in the sleep mode still sends the setting commands to the peripheral device 140 via the controller. Although the frequency for sending commands by the first operating system 110 in the sleep mode is lower than that in the normal mode, the command settings, if not properly controlled, may still cause conflicts to occur with other commands sent from the second operating system 120. Thus, the re-initialization performed by the second operating system 120 may fail due to the conflicts. Therefore, the controller 130 of the present invention performs the following steps to the problem.

Figure 3:
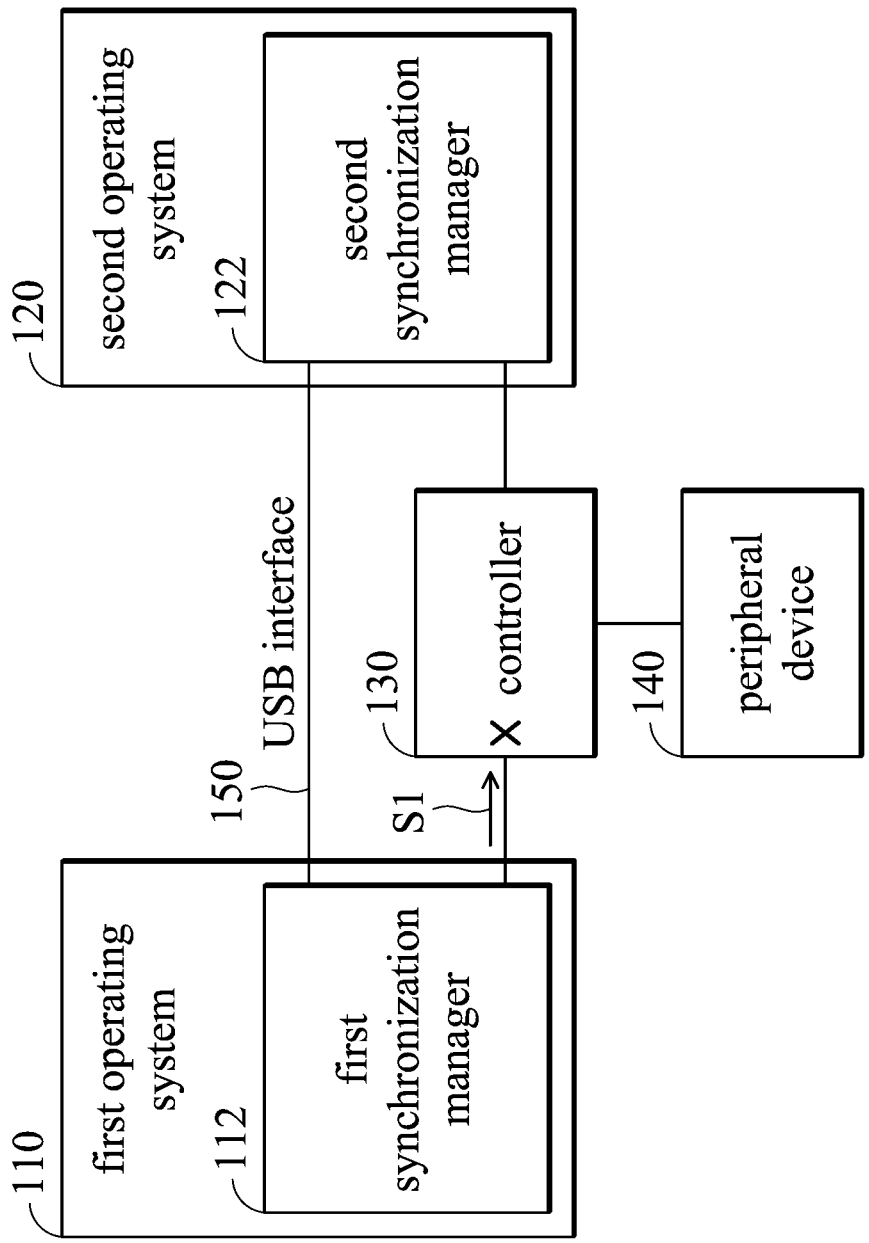
FIG. 3 shows the setting command S1 in step S208 and illustrates how the controller 130 intercepts the setting command S1.

In step S208 of the first embodiment, the controller 130, after knowing that the first operating system 110 is switched to the second operating system 120, prevents the first operating system, which is in the sleep mode, from issuing any setting command to the peripheral device 140 (by bypassing or not executing the setting command). FIG. 3 shows the setting command S1 in step S208 and illustrates how the controller 130 intercepts the setting command S1. The step S208 helps to make sure that the peripheral device 140 only receives setting commands from one operating system (in the embodiment, the second operating system 120) and to prevent receiving commands from the dual operating systems at the same time.

The manner described above prevents the peripheral devices from initialization failure by intercepting the setting commands sent from the first operating system 110. However, since the first operating system 110 in the sleep mode can not receive any response from the peripheral device 140, the procedure for resuming (when switching back to) the first operating system 110 may fail or become very slow. Therefore, the present invention further provides another preferred embodiment in the following.

Method for Switching Between Dual Operating Systems—Second Embodiment

Figure 4:
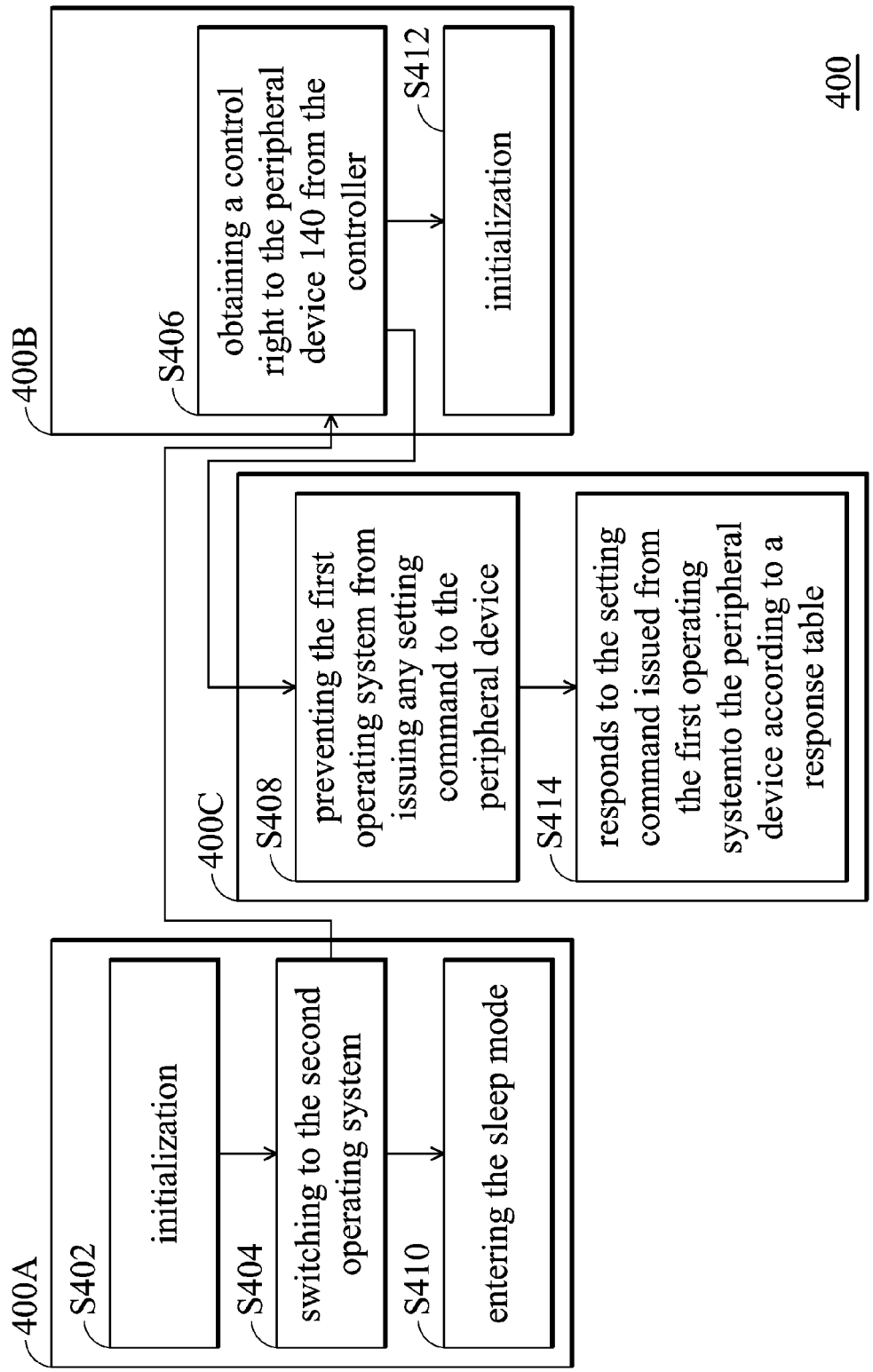
FIG. 4 is a flow chart of the method for switching between dual operating systems according to the second embodiment of the present invention.

FIG. 4 is a flow chart of the method for switching between dual operating systems according to the second embodiment of the present invention. Please refer to FIGS. 1 and 4. Similar to the first embodiment, the method 400 of the present invention can be performed in the electronic device 100, and comprises the processes 400A performed by the first synchronization manager 112 under the first operating system 110, the processes 400B performed by the second synchronization manager 122 under the second operating system 120, and the processes 400C performed by the controller 130. The processes 400A the first operating system 110 comprises: in step S402, initializing the peripheral device 140 via the controller 130; in step S404, when receiving a command for switching operating system from a user, activating (awaking) the second operating system 120 via controller 130, communicating with the second operating system 120 via the transmission interface 150, and switching to the second operating system 120 via the controller 130; and finally entering the sleep mode in step S410. The processes 400B of the second operating system 120 comprises: in step S406, obtaining a control right to the peripheral device 140 from the controller 130 and finishing the switching of the operating systems; and re-initializing the peripheral device 140 in step S412. In step S408 of the second embodiment, the controller 130 after knowing that the first operating system 110 is switched to the second operating system 120, prevents the first operating system, which is in the sleep mode, from issuing any setting command to the peripheral device 140 (by bypassing or not executing the setting command).

Figure 5:
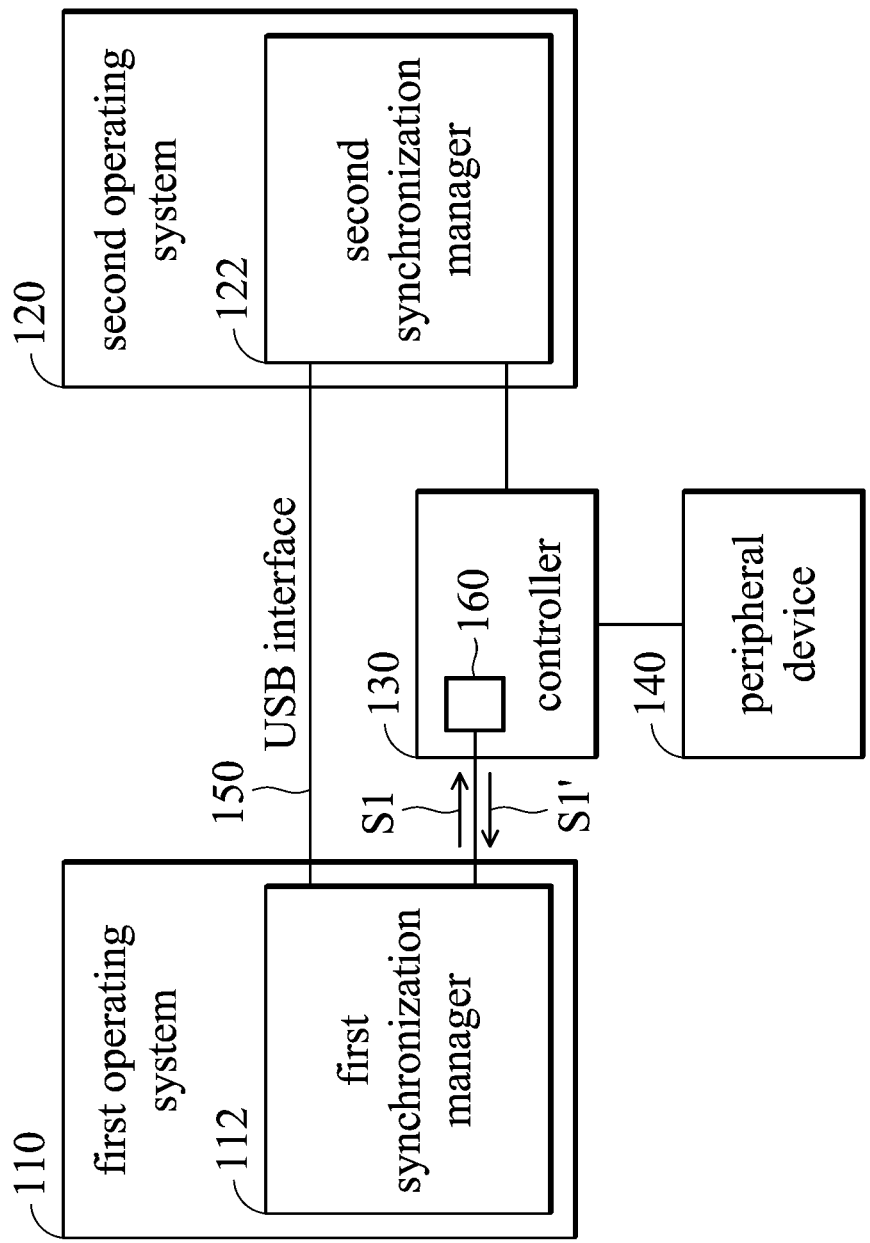
FIG. 5 shows the setting command S1, the response message S1' and the response table 160 described in step S414.

Different from the first embodiment, the second embodiment further comprises a step S414. In step S414, the controller 130 further responds to the setting command which is issued from the first operating system 110 to the peripheral device 140 according to a response table 160 (stored in the controller 130 as shown in FIG. 5). The response table 160 records the setting command S1 and a response message S1' indicating that the peripheral device is expected to respond to the first operating system 110. FIG. 5 shows the setting command S1, the response message S1' and the response table 160 described in step S414. In short, the controller 130 in the embodiment simulates the peripheral device 140 to respond to the setting commands issued from the first operating system 110, thus making sure that the first operating system 110 can resume from the sleep mode as soon as possible without being affected by the setting commands which are not sent properly. The embodiment can achieve smoother switching between the dual operating systems.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for switching between dual operating systems for an electronic device installed with at least two operating systems, comprising the steps of:
    activating and operating a first operating system, wherein the first operating system initializes at least one peripheral device;
    switching to and activating a second operating system;
    preventing the first operating system from issuing a setting command to the peripheral device when the first operating system is switched to the second operating system; and
    enabling the second operating system to obtain the control right of the peripheral device to initialize the peripheral device;
    wherein the step of preventing the first operating system from issuing a setting command to the peripheral device comprises responding to the setting command issued by the first operating system to the peripheral device according to a response table when the first operating system is switched to the second operating system.

2. The method for switching between dual operating systems as claimed in claim 1, wherein the step of preventing the first operating system from issuing a setting command to the peripheral device further comprises:
    bypassing and not executing the setting command of the first operating system.

3. The method for switching between dual operating systems as claimed in claim 1, wherein the response table records the setting command and a response message indicating that the peripheral device is expected to respond to the setting command of the first operating system.

4. The method for switching between dual operating systems as claimed in claim 1, wherein the first operating system enters into a sleep mode after being switched to the second operating system.

5. The method for switching between dual operating systems as claimed in claim 1, wherein the first operating system directly transmits a notification message to the second operating system via a transmission interface to switch to the second operating system.

6. An electronic device installed with a first operating system and a second operating system and having at least one peripheral device, comprising:
    a first synchronization manager, operating under the first operating system;
    a second synchronization manager, operating under the second operating system; and
    a controller, coupled to the first synchronization manager, the second synchronization manager and the at least one peripheral device, preventing the first operating system from issuing the setting command to the peripheral device when the first operating system is switched to the second operating system;
    wherein the controller bypasses and does not execute the setting command from the first operating system to prevent the first operating system from issuing the setting command to the peripheral device; and
    wherein the controller further responds to the setting command issued by the first operating system to the peripheral device according to a response table when the first operating system is switched to the second operating system to prevent the first operating system from issuing the setting command to the peripheral device.

7. The electronic device as claimed in claim 6, wherein the response table records the setting command and a response message indicating that the peripheral device is expected to respond to the setting command of the first operating system.

8. The electronic device as claimed in claim 6, wherein the first operating system initializes the peripheral device before being switched to the second operating system.

9. The electronic device as claimed in claim 6, wherein the first operating system enters into a sleep mode after being switched to the second operating system.

10. The electronic device as claimed in claim 6, wherein the second operating system initializes the peripheral device after the controller prevents the first operating system from issuing the setting command to the peripheral device.

11. The electronic device as claimed in claim 6, further comprises:
    a transmission interface, coupled between the first synchronization manager and the second synchronization manager,
    wherein the first synchronization manager directly transmits a notification message to the second synchronization manager via the transmission interface to switch to the second operating system.

12. The electronic device as claimed in claim 6, wherein the transmission interface is a universal serial bus (USB) interface.

* * * * *